(12) United States Patent
Renner et al.

(10) Patent No.: US 12,487,223 B2
(45) Date of Patent: Dec. 2, 2025

(54) TRANSMITTER DEVICE

(71) Applicant: HUSQVARNA AB, Huskvarna (SE)

(72) Inventors: Thomas Renner, Ulm (DE); Matthias Müller-Braun, Neu-Ulm (DE)

(73) Assignee: HUSQVARNA AB, Huskvarna (SE)

(*) Notice: Subject to any disclaimer, the term of this patent is extended or adjusted under 35 U.S.C. 154(b) by 574 days.

(21) Appl. No.: 17/801,395

(22) PCT Filed: Dec. 9, 2020

(86) PCT No.: PCT/EP2020/085305
§ 371 (c)(1),
(2) Date: Aug. 22, 2022

(87) PCT Pub. No.: WO2021/175473
PCT Pub. Date: Sep. 10, 2021

(65) Prior Publication Data
US 2022/0412943 A1    Dec. 29, 2022

(30) Foreign Application Priority Data
Mar. 2, 2020 (EP) ..................... 20160441

(51) Int. Cl.
*G01N 33/24* (2006.01)
*G08C 17/02* (2006.01)
*H01Q 1/22* (2006.01)

(52) U.S. Cl.
CPC ............. *G01N 33/24* (2013.01); *G08C 17/02* (2013.01); *H01Q 1/22* (2013.01); *G01N 33/245* (2024.05)

(58) Field of Classification Search
CPC ...... G01N 33/24; G01N 33/245; G08C 17/02; H01Q 1/22
See application file for complete search history.

(56) References Cited

U.S. PATENT DOCUMENTS

| | | | |
|---|---|---|---|
| 2012/0175969 A1* | 7/2012 | Maughan | H01F 38/14 307/104 |
| 2016/0061762 A1 | 3/2016 | Buss | |
| 2018/0102655 A1 | 4/2018 | Miller et al. | |

FOREIGN PATENT DOCUMENTS

| | | | |
|---|---|---|---|
| CN | 102506941 A | | 6/2012 |
| CN | 203148876 U | | 8/2013 |
| CN | 203758646 U | * | 8/2014 |

(Continued)

OTHER PUBLICATIONS

International Search Report and Written Opinion for PCT Application No. PCT/EP2020/085305, dated Feb. 2, 2021.

*Primary Examiner* — Fatemeh Esfandiari Nia
(74) *Attorney, Agent, or Firm* — Burr & Forman

(57) ABSTRACT

A transmitter device (100) includes a housing (102). The transmitter device (100) has a cable (110). The cable (110) is at least partially housed within the housing (102) and electrically connected to a socket (130). Further, the transmitter device (100) has a sensor (106). The sensor (106) is electrically coupled with the cable (110). The transmitter device (100) further includes a cover (104). The cover (104) at least partially covers the sensor (106). The transmitter device (100) is characterized in that the socket (130) is disposed outside the housing (102), and the socket (130) is flexibly coupled to the housing (102) through the cable (110). The housing (102) includes a channel (111) such that the cable (110) is slidably received within the channel (111).

5 Claims, 5 Drawing Sheets

(56) References Cited

FOREIGN PATENT DOCUMENTS

| | | | |
|---|---|---|---|
| CN | 107525854 A | | 12/2017 |
| CN | 107976526 A | | 5/2018 |
| CN | 207355132 U | | 5/2018 |
| CN | 108281874 A | | 7/2018 |
| CN | 207571050 U | | 7/2018 |
| CN | 108693325 A | | 10/2018 |
| CN | 110793575 A | * | 2/2020 |
| CN | 210037800 U | | 2/2020 |

* cited by examiner

TRANSMITTER DEVICE

TECHNICAL FIELD

The present disclosure relates to a transmitter device. More specifically, the present disclosure relates to the transmitter device which provides a safe and trouble-free operation in relation to cables and associated sockets of the transmitter device.

BACKGROUND

The transmitter device may be used indoors or outdoors. For example, a soil sensor may be used in the lawn due to its flat design. Further, the soil sensor may have a cable and associated socket. In case the transmitter device is electronically arranged to also act as a transceiver device it includes both a transmitter and a receiver. In this case the transmitter and receiver may be combined and share common circuitry or a single housing.

However, there may be instances where working with the cable-connected sensor may become troublesome and risk-prone. Generally, a cable connected to a housing of the soil sensor may get damaged during gardening work. For example, the cable-connected soil sensor may be driven over by a mowing robot, lawn mower and the like. This movement over the soil sensor may lead to a large mechanical load being placed/exerted on a plug connection coupled to the cable at the housing, possibly leading to breaking or loosening of the plug connection. This may even damage the plug connection and render the entire transmitter unusable and accident-prone.

There have been efforts in the past to check mechanical loads and pressures on the cable and plug connection (or socket) from external sources such as lawn movers and the like. However, the cable and the plug connection are generally directly connected with the housing leading to propagation of the mechanical loads and pressures from the housing to the cable and the plug connection. Such arrangements are inherently damage and accident-prone and not desirable by common users.

An example of a transmitter device is provided by Chinese reference CN 207,355,132 (hereinafter referred to as '132 reference). The '132 reference discloses a wireless communication device which includes a communication module and a wireless communication antenna. The communication module is screwed into the top of the metal box. Further, a main controller of the central controller is provided with an external plug, which is led from the electrical box to the outside of the metal box. However, the '132 reference seems short of providing any arrangement of protecting, covering the external plug or any wires connected therewith. This may lead to damage to the external plus and wires of the sensor, such as for ground based applications.

Further, US2016061762 reference discloses a sensor arrangement having a housing. The housing has a body adapted for housing a soil moisture sensor arrangement where sensors are arranged within and along the length of the housing. The sensors are connected to a data collection device via multi-stranded cable. Further, another reference CN203148876 discloses a detector for soil humidity which includes a charging socket, while CN102506941 discloses a transmitter device with a sensor. However, these references do not seem to disclose any arrangement for protection, safety of any cable of the sensor(s). Further, these references also seem silent on protection of the cable from mechanical and other application loads, say by any housing or mounting features within the housing of the sensor.

Thus, there is a need for an improved transmitter device which prevents various parts such as cable, plug connection of the transmitter device from mechanical pressures and loads from external sources.

SUMMARY

In view of the above, it is an objective of the present invention to solve or at least reduce the drawbacks discussed above. The objective is at least partially achieved by a transmitter device which is a soil sensor. The transmitter device includes a housing. The transmitter device has a cable. The cable is at least partially housed within the housing and electrically connected to a socket. Further, the transmitter device has a sensor. The sensor is electrically coupled with the cable. The transmitter device further includes a cover. The cover at least partially covers the sensor. The transmitter device is characterized in that the socket is disposed outside the housing, and the socket is flexibly coupled to the housing through the cable. Further, the housing includes a channel such that the cable is slidably received within the channel. This may provide space to the cable to move freely, particularly during inadvertent movement of the housing from external mechanical loads and pressures. Thus, the present disclosure provides simple, safe and trouble-free operation in relation to the cable and the socket associated with the transmitter device.

According to an embodiment of the present invention, the socket is coupled to the sensor through the cable. The socket may provide power and/or allow data communication with sensor and other components of the transmitter device.

According to an embodiment of the present invention, the socket is electrically connected to a water computer remote from the transmitter device. The socket may be connected to any external power source, or processor and the like as per the need of the application.

According to an embodiment of the present invention, the socket connector is a watertight connector. This may provide desired water-tight capability and prevent liquid entry. Further, this may provide shock free application of the transmitter device.

According to an embodiment of the present invention, the cover and the housing include one or more seals therebetween. This may provide desired water-tight capability and prevent liquid entry inside the housing of the transmitter device.

According to an embodiment of the present invention, the housing includes one or more integral ribs. The one or more integral ribs may provide enhanced strength to the housing of the transmitter device, particularly from vertical loads (such as lawn movers) acting on the housing.

According to an embodiment of the present invention, the transmitter device may measure at least one parameter associated with surrounding environment of the sensor. The transmitter device may then transmit the measured parameter to any connected device such as robotic mower, user device (laptop, smartphone etc.) and the like.

According to an embodiment of the present invention, the transmitter device is electronically arranged to act as a transceiver device. This allows additional use cases, as with this embodiment the thus realized transceiver device is also able to receive data from a remote location and thus can be remotely controlled.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
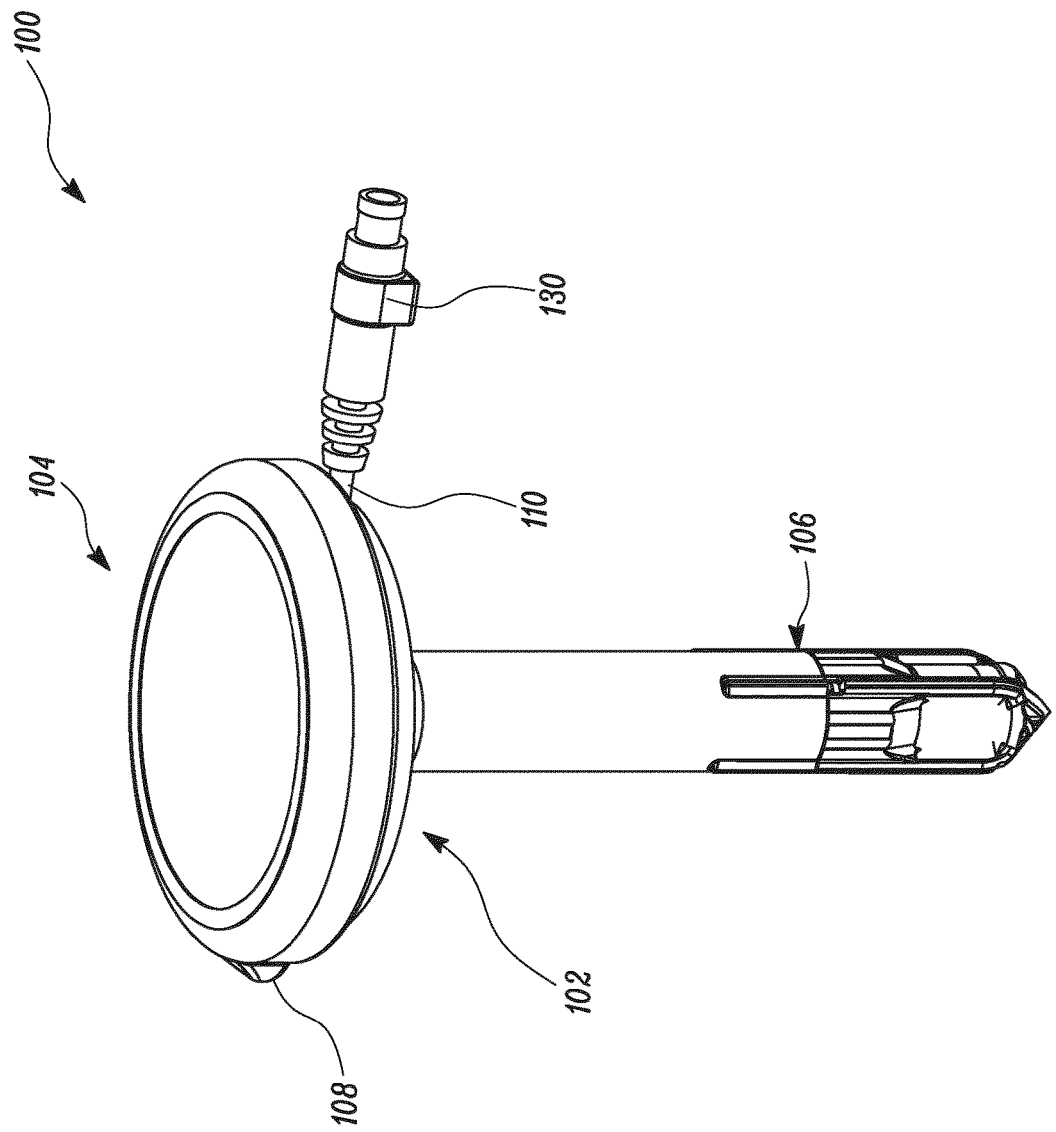
FIG. 1 shows a perspective view of a transmitter device along with some important parts thereof, in accordance with an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates a transmitter device 100 along with some important parts of the transmitter device 100. The transmitter device 100 finds applications in outdoor environments such as gardens, lawns and the like where monitoring of ground/soil/environment factors (say temperature, humidity, solar radiation) is required. The transmitter device 100 of the present disclosure may be readily implemented with any sensor, particularly sensors used in outside (garden) applications, such as the soil sensor. The transmitter device 100 may measure at least one parameter associated with surrounding environment of a sensor 106. The transmitter device 100 may then transmit the measured parameter to any connected device such as robotic mower, user device (laptop, smartphone etc.) and the like.

The transmitter device 100 which is generally a soil sensor, includes a housing 102. Electronic components (not shown) are housed within the housing 102. The transmitter device 100 of the present disclosure may be implemented with or without batterie(s). The present disclosure illustrates a cable-based transmitter device 100 which may not require use of the batteries from implementation considerations. The transmitter device 100 further includes a cover 104. The cover 104 at least partially covers the sensor 106 or other components within the housing 102. The cover 104 has a tab 108. The tab 108 may help to remove the cover 104 from the housing 102 of the transmitter device 100. The transmitter device 100 further has a cable 110. The cable 110 is at least partially housed within the housing 102 and electrically connected to a socket 130. Moreover, the sensor 106 is electrically coupled with the cable 110.

In some embodiments, the cable 110 may be made up of a material selected from rubber, aluminum or plastic. Nature of the material is chosen as per the requirements of the common user. The desired nature of the material may provide the cable 110 with certain characteristic features such as flexibility, elasticity, rigidity, heat or vibrations resistant properties, in accordance with requirements of the present disclosure.

In some embodiments, the socket 130 may be manufactured by three-dimensional printing. Use of three-dimensional printing (alternatively, 3D printing) may provide versatility of using different materials along with lower lead-time in manufacturing and design of the socket 130.

Figure 2:
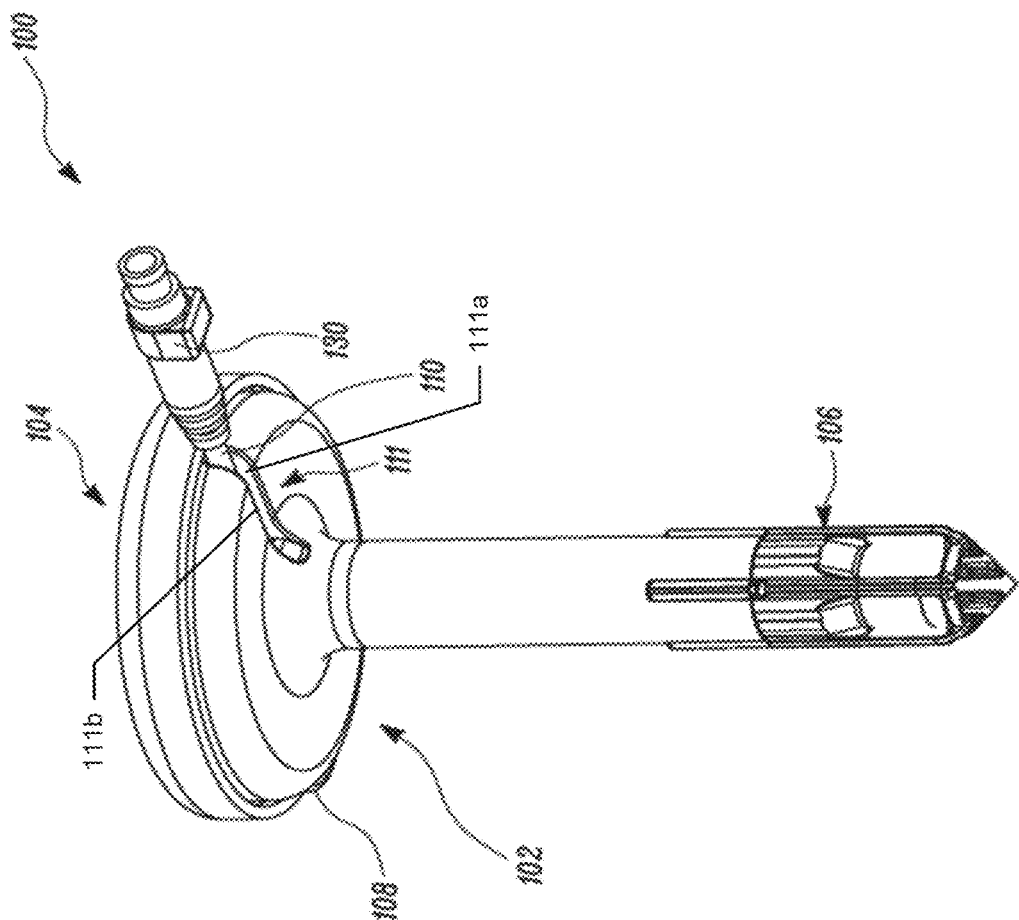
FIG. 2 shows a perspective view of the transmitter device with a cable within a channel, in accordance with an embodiment of the present invention.

FIG. 2 illustrates an exemplary transmitter device 100 with the cable 110 within a channel 111. The cable 110 runs partially under the housing 102. The housing 102 includes the channel 111 such that the cable 110 is slidably received within the channel 111. As seen in FIG. 2, the channel 111 is defined between a first sidewall 111a and a second sidewall 111b, the first and second sidewalls (111a, 111b) being spaced apart from one another by a distance approximately equal to a width of the cable 110. The channel 111 may provide a shield and house the cable 110 such that the cable 110 is not disturbed due to any loads on the transmitter device 100. The channel 111 may protect the cable 110 from mechanical loads such as the cable 110 protrudes beyond the housing 102 to connect with the socket 130. The part of the cable 110 protruding out of the housing 102 may prevent the socket 130 and/or the cable 110 from different types of damages which may occur during gardening work, or from mechanical shocks from movement of lawn movers and the like. For example, the protruding part of the socket 130 and/or the cable 110 may not be affected much by the lawn mowers or tractors moving over the transmitter device 100.

The channel 111 may allow the cable 110 to move freely therein and check undesired propagation of forces to the cable 110 from the housing 102. The socket 130 is coupled to the sensor 106 through the cable 110. The socket 130 may provide power or serve to allow data communication to/with the transmitter device 100. The socket 130 is disposed outside the housing 102, and the socket 130 is flexibly coupled to the housing 102 through the cable 110.

Figure 3:
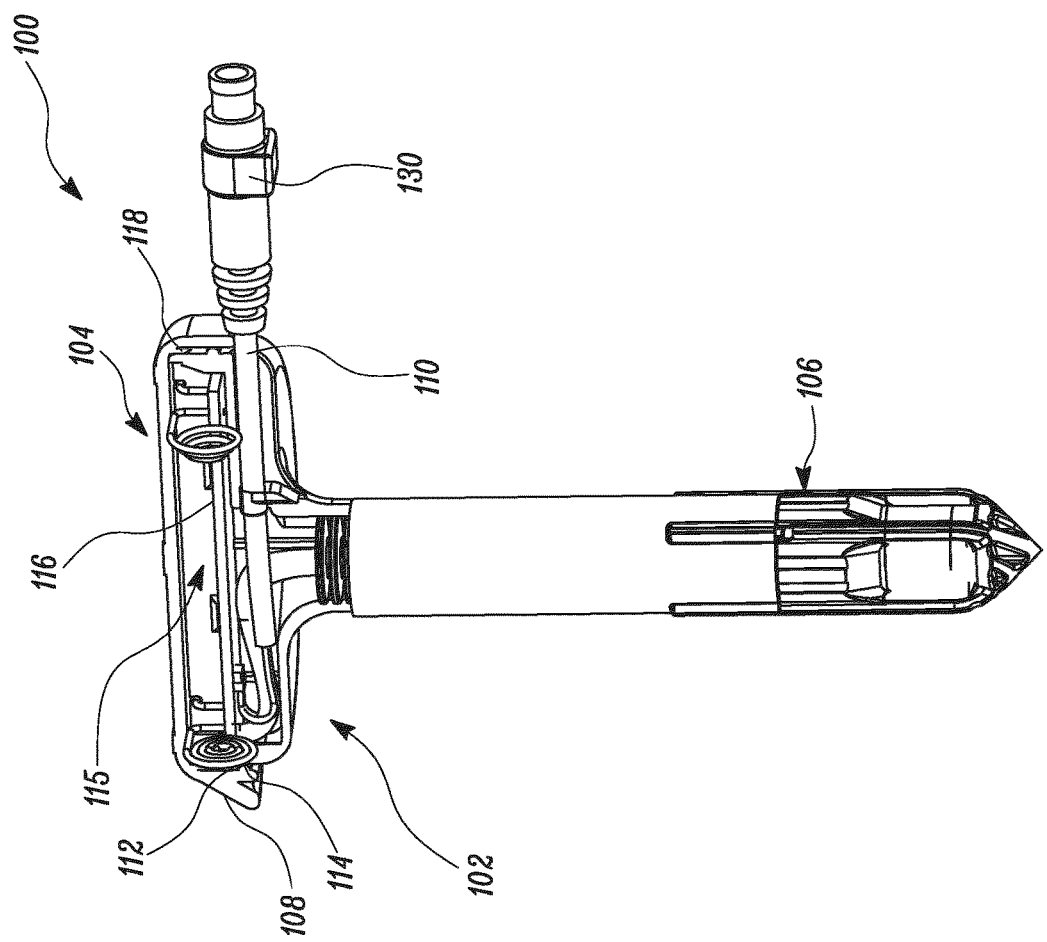
FIG. 3 shows a partial side-sectional view of the transmitter device, in accordance with an embodiment of the present invention.

FIG. 3 illustrates a substantially stable position of the cable 110 relative to the housing 102 of the transmitter device 100. The housing 102 may include one or more integral ribs 116. This may provide enhanced structural strength to the transmitter device 100, particularly to sustain mechanical loads from moving lawn movers and the like. The one or more integral ribs 116 may further allow ease and intensity of transfer of force flow from the cover 104 directly into the housing 102. The housing 102 has a protrusion 112. Further, the cover 104 has a complementary protrusion 114. The protrusion 112 and the complementary protrusion 114 allow desired assembly of the cover 104 with the housing 102. The cover 104 and the housing 102 may include one or more seals 118 therebetween. In some embodiments, a radial 2K lip seal or O-ring may be provided with the cover 104 and the housing 102. This may provide desired water-tight capability and prevent liquid entry inside the housing 102 of the transmitter device 100.

The transmitter device 100 as depicted includes a battery compartment 115. The battery compartment 115 includes the battery. The housing 102 includes an antenna (not shown). This may help to communicate the monitored information (of soil and the like) to an external device such as robotic mowers, user devices (say laptop, tab, smart phone). The antenna may be at least partially covered by the cover 104. Presence of the cover 104 may protect the transmitter device 100 from external agents (say dust, moisture) while extending working life of the transmitter device 100.

In some embodiments, the housing 102 is divided into a battery housing and an antenna housing. Separation of the battery housing and the antenna housing may be due to ergonomic consideration, ease of maintenance and low interference between working (say signals) from the antenna, radio and electronic devices of the transmitter device 100 among others. In some embodiments, the battery may be a rechargeable battery, particularly which may be timely charged by use of solar radiation and the like during outdoor applications. The present disclosure may be readily implemented with the battery, and the transmitter device 100 may be a cord-based device for powering and data transmission purposes.

Figure 4:
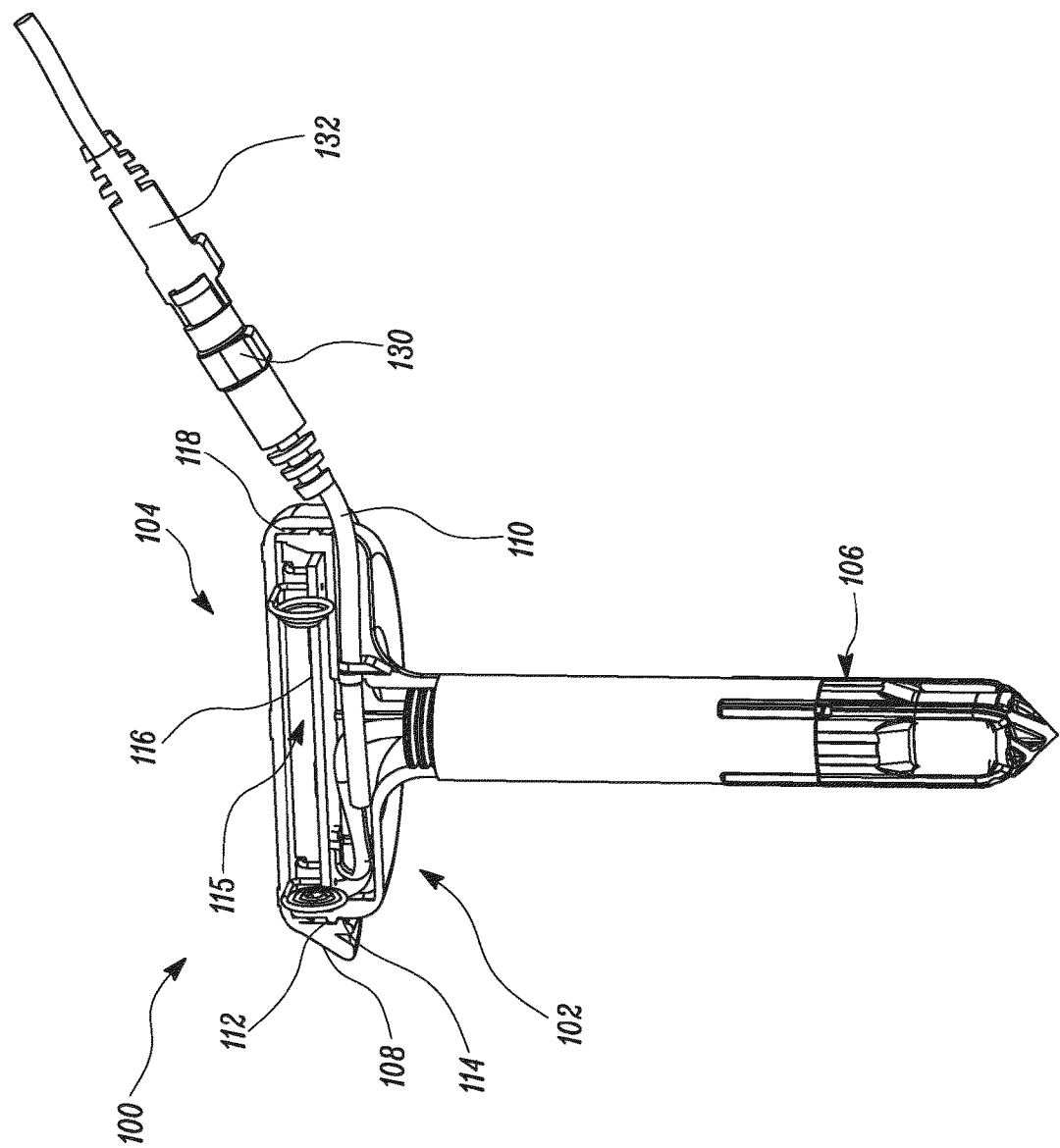
FIG. 4 shows a partial side-sectional view of the transmitter device having a socket connected to a connection port, in accordance with another embodiment of the present invention.

FIG. 4 illustrates the transmitter device 100 with the cable 110 in a different position with respect to the housing 102. The present figure illustrates the socket 130 connected to a connection port 132. The socket 130 of the transmitter device 100 is not integrated into the housing 102, to allow uninterrupted, desired movement of the cable 110 and/or the socket 130 within the channel 111 as per the need. The socket 130 is illustrated as offset from walls or boundaries of the housing 102 of the transmitter device 100, to allow the uninterrupted, desired movement therewithin. The socket 130 is electrically connected to a water computer (not shown), or any power source remote from the transmitter device 100. The cable 110 extending out of the housing 102, and the socket 130 are flexible to readily allow adjustments or movements of the cable 110 and the socket 130 within the channel 111.

During implementation, when the transmitter device 100 is installed (such as in a ground surface) there is substantially low chances of damage even if there are mechanical load, pressure (say from lawn movers, tractors, users and the like) on the cover 104, the housing 102, or even the plugged-in cable 110 of the transmitter device 100.

Figure 5:
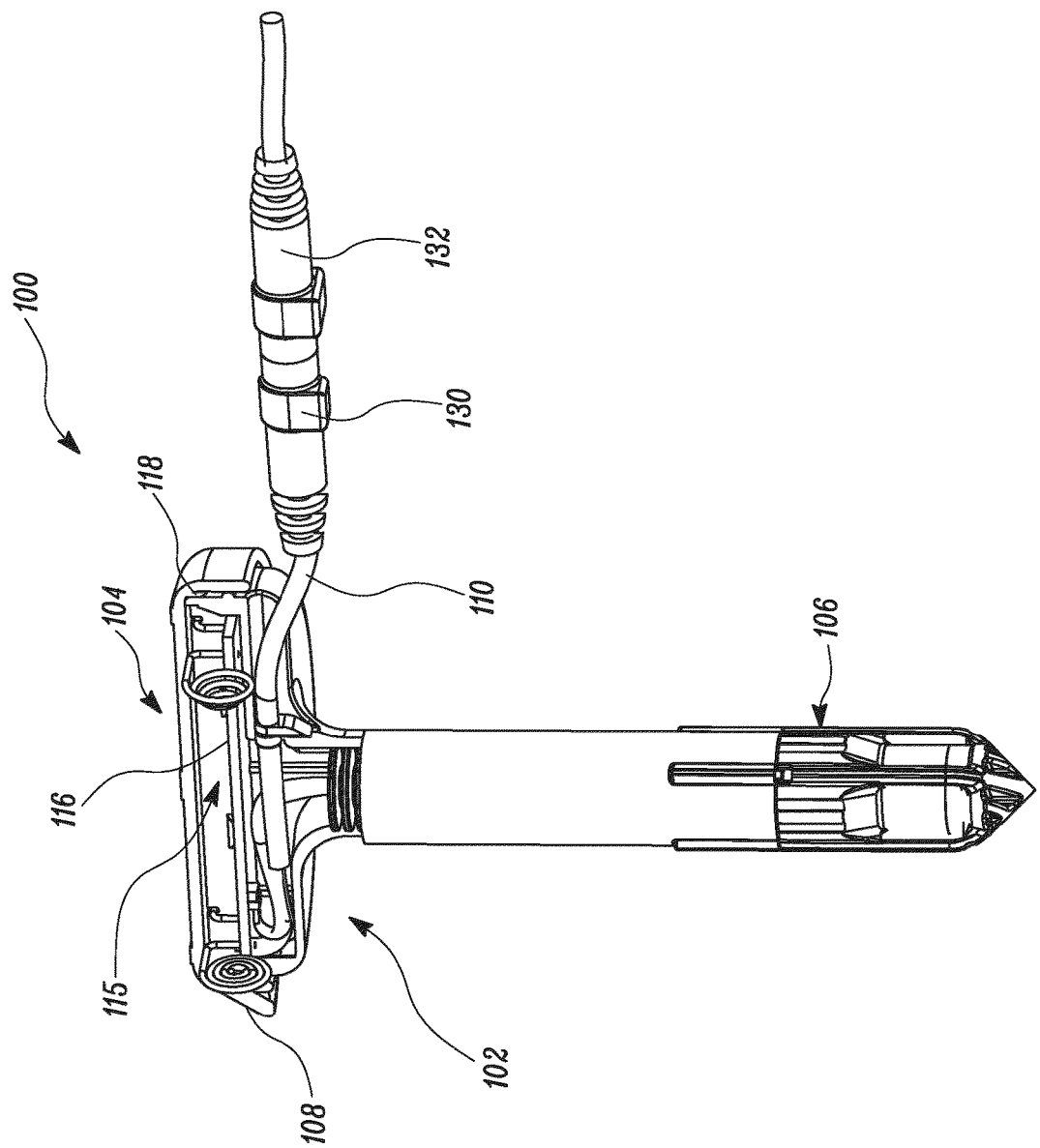
FIG. 5 shows a partial side-sectional view of the transmitter device indicating changed position of the socket and the connection port, in accordance with an embodiment of the present invention.

FIG. 5 illustrates the transmitter device 100 back into the substantially stable position. As will be evident to a person having knowledge in the art, there may be many such stable positions possible, such as between the positions shown in FIGS. 3-5. The channel 111 may allow desired movement, resting, adjustment of the cable 110 and prevent the cable 110 from mechanical loads or pressure. Hence, the channel 111 of the transmitter device 100 may increase the service life of the cable 110 by checking undesired loads from the transmitter device 100.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Transmitter Device
102 Housing
104 Cover
106 Sensor
108 Tab
110 Cable
111 Channel
112 Protrusion
114 Protrusion
115 Battery Compartment
116 Ribs
118 Seal
130 Socket
132 Connection Port

The invention claimed is:

1. A transmitter device being a soil sensor, comprising:
a housing;
a cable at least partially housed within the housing and electrically connected to a socket;
a sensor electrically coupled with the cable; and
a cover at least partially covering the sensor;
wherein the socket is disposed outside the housing, and the socket is flexibly coupled to the housing through the cable,
wherein the housing includes a channel such that the cable is slidably received within the channel,
wherein the socket allows data communication with the sensor and other components of the transmitter device, with the transmitter device being connected via the socket for external processing,
wherein the channel is defined between a first sidewall and a second sidewall, the first and second sidewalls being spaced apart from one another by a distance approximately equal to a width of the cable, and
wherein the channel extends vertically into the housing and is open at an underside of the housing enabling the cable to move within the channel relative to the housing.

2. The transmitter device of claim 1, wherein the socket is a watertight connector.

3. The transmitter device of claim 1, wherein the cover and the housing include one or more seals therebetween.

4. The transmitter device of claim 1, wherein the housing includes one or more integral ribs.

5. The transmitter device of claim 1, wherein transmitter device is electronically arranged to act as a transceiver device.

* * * * *